(12) United States Patent
Selmanovic et al.

(10) Patent No.: US 10,169,970 B2
(45) Date of Patent: Jan. 1, 2019

(54) LOCATION TRACKING SYSTEM

(71) Applicant: FILIP TECHNOLOGIES UK LTD., London (GB)

(72) Inventors: Demir Selmanovic, Sarajevo (BA); Sten Kirkbak, Trondheim (NO); Pål Selnaes, Morrisville, NC (US); William Herbert Darden, Cary, NC (US); Admir Tuzovic, Sarajevo (BA)

(73) Assignee: FILIP TECHNOLOGIES UK LTD., London (GB)

( * ) Notice: Subject to any disclaimer, the term of this patent is extended or adjusted under 35 U.S.C. 154(b) by 0 days.

(21) Appl. No.: 14/759,046

(22) PCT Filed: Jan. 4, 2013

(86) PCT No.: PCT/US2013/020355
§ 371 (c)(1),
(2) Date: Jul. 2, 2015

(87) PCT Pub. No.: WO2014/107160
PCT Pub. Date: Jul. 10, 2014

(65) Prior Publication Data
US 2015/0332573 A1 Nov. 19, 2015

(51) Int. Cl.
*H04W 4/02* (2009.01)
*G08B 21/02* (2006.01)
(Continued)

(52) U.S. Cl.
CPC ..... *G08B 21/0241* (2013.01); *G08B 21/0288* (2013.01); *H04L 9/0891* (2013.01); *H04L 9/3213* (2013.01); *H04L 67/1095* (2013.01); *H04L 67/34* (2013.01); *H04W 4/02* (2013.01); *H04W 4/029* (2018.02); *H04W 4/20* (2013.01);
(Continued)

(58) Field of Classification Search
CPC ....... H04W 4/02; H04W 64/00; H04W 4/028; H04W 4/20; H04W 12/04; H04W 12/08; H04W 4/50; H04M 1/72572; H04L 29/08657; H04L 67/1095; H04L 67/34; H04L 67/029; H04L 9/0891; H04L 9/3213; G01C 21/20; G08B 21/0241; G08B 21/0288
See application file for complete search history.

(56) References Cited

U.S. PATENT DOCUMENTS

2009/0216846 A1  8/2009  Burroughs et al.
2009/0264137 A1* 10/2009  Soliman ............... G01S 5/0072
                                                  455/456.1
(Continued)

FOREIGN PATENT DOCUMENTS

EP   1672935 A1    6/2006
WO   2008112819 A2 9/2008
WO   2010111017 A1 9/2010

*Primary Examiner* — Ted Wang
(74) *Attorney, Agent, or Firm* — Ballard Spahr LLP

(57) ABSTRACT

A location tracking system is provided for tracking the location of a child or other individual. The location tracking system includes a location server and one or more location tracking devices. Communication protocols are provided for communications between the location server and the location tracking devices. The communication protocols provide a low complexity and low cost solution for location tracking applications.

6 Claims, 12 Drawing Sheets

(51) Int. Cl.
*H04W 12/04* (2009.01)
*H04L 29/08* (2006.01)
*H04W 4/20* (2018.01)
*H04L 9/08* (2006.01)
*H04W 12/08* (2009.01)
*H04L 9/32* (2006.01)
*H04W 4/50* (2018.01)
*H04W 4/029* (2018.01)

(52) U.S. Cl.
CPC ............ *H04W 4/50* (2018.02); *H04W 12/04* (2013.01); *H04W 12/08* (2013.01); *H04L 2209/80* (2013.01)

(56) References Cited

U.S. PATENT DOCUMENTS

| | | | |
|---|---|---|---|
| 2011/0035284 A1* | 2/2011 | Moshfeghi | G06Q 30/02 705/14.58 |
| 2012/0042046 A1* | 2/2012 | Petersen | G06Q 30/0282 709/219 |
| 2012/0046110 A1 | 2/2012 | Amaitis et al. | |
| 2014/0065997 A1* | 3/2014 | Walker | H04W 4/02 455/404.1 |
| 2014/0213283 A1* | 7/2014 | Gillett | G01S 5/0072 455/456.1 |

* cited by examiner

| MESSAGE BYTE | 0 | 1 | 0 | 0 | 1 | 0 | 1 | 1 | 75 |
|---|---|---|---|---|---|---|---|---|---|
| | | | | | XOR | | | | |
| KEY BYTE | 1 | 0 | 1 | 0 | 1 | 0 | 0 | 1 | 169 |
| ENCRYPTED BYTE | 1 | 1 | 1 | 0 | 0 | 0 | 1 | 0 | 226 |
| | | | | | XOR | | | | |
| KEY BYTE | 1 | 0 | 1 | 0 | 1 | 0 | 0 | 1 | 169 |
| DECRYPTED BYTE | 0 | 1 | 0 | 0 | 1 | 0 | 1 | 1 | 75 |

FIG. 6

LOCATION TRACKING SYSTEM

FIELD OF THE INVENTION

The present invention relates generally to location tracking devices for tracking the location of a person or article and, more particularly, to communication protocols for communicating with a location tracking device associated with a person or article.

BACKGROUND

Location tracking devices for monitoring the location of a child are known. Typically, a tracking device is incorporated into an article that is worn or carried by the child. The tracking device typically includes a Global Positioning System (GPS) receiver for determining its location and a transceiver unit for sending the location information to a location server. The location tracking device may be programmed to send its location to the location server at predetermined intervals, or in response to predetermined events. The location server may include a portal that can be accessed by a parent to monitor the location of the child. Knowing the location of a child may provide peace of mind to a concerned parent. If a child happens to get lost or abducted, the location tracking system can be used to find the child.

To date, location tracking devices for tracking the location of a child or other individual have not been used on a widespread basis. One impediment to such widespread use is the cost and complexity of such devices. Accordingly, there remains a need for a simple, low cost solution for tracking the location of a child.

SUMMARY

The present invention relates to location tracking systems for tracking the location of a child or other individual. The location tracking system includes a location server and one or more location tracking devices. Communication protocols are provided for communications between a location server and the location tracking devices. The communication protocols provide a low complexity and low cost solution for location tracking applications.

BRIEF DESCRIPTION OF THE DRAWINGS

FIG. 6 illustrates an exemplary encryption and decryption method used in one exemplary embodiment.

DETAILED DESCRIPTION

Figure 1:
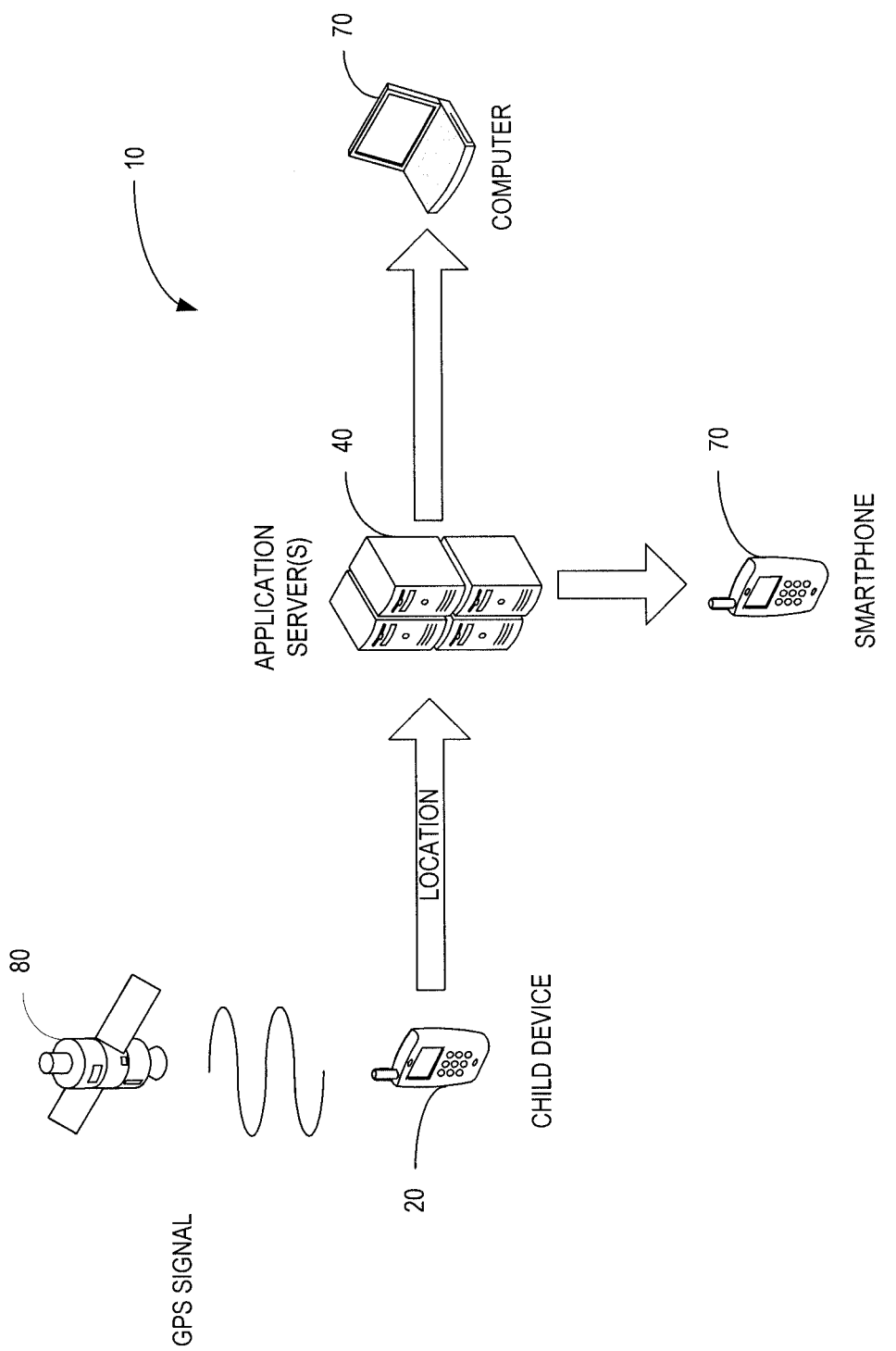
FIG. 1 illustrates an exemplary location tracking system according to an exemplary embodiment that includes a location server and location tracking device.

FIG. 1 illustrates a location tracking system 10 according to one exemplary embodiment. The location tracking system 10 comprises a location tracking device 20, a location server 40, and a monitoring device 70. The location tracking device 20 is configured as an article that can be worn or carried by a child. The location tracking device 20 receives signals from satellites 80 in Global Navigation Satellite System (GNSS) and periodically determines its location. At periodic intervals, or in response to predetermined events, the location tracking device 20 reports its location to the location server 40. The location server 40 stores the reported locations of the location tracking device 20 and provides a web-based portal that may be accessed by the monitoring device 70. The web-based portal provides a secure log-in to the monitoring device 70 so that the parent can monitor the location of the child associated with the location tracking device 20. The monitoring device 70 may comprise, for example, a computer, smartphone, or other communication device with Internet capabilities.

Figure 2:
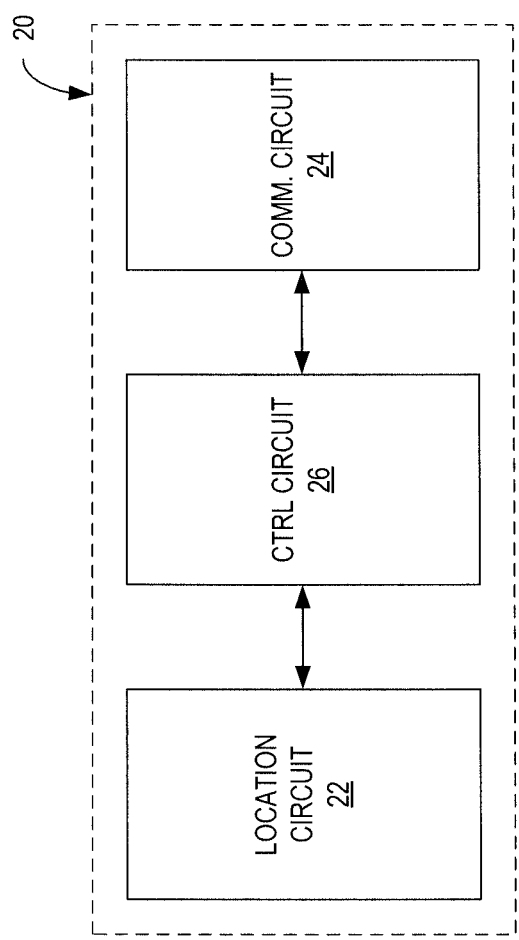
FIG. 2 illustrates the main functional components of a location tracking device.

The location tracking device 20, shown in FIG. 2, includes a location circuit 22 for determining the location of the location tracking device 20, a communication circuit 24 for communicating with the location server 40, and a control circuit 26. In one exemplary embodiment, the location circuit 22 comprises a Global Positioning System (GPS) receiver for receiving signals from GPS satellites 80 and estimating the location of the location tracking device. The communication circuit 24 may comprise a fully-functional cellular transceiver, WiFi transceiver, Bluetooth transceiver, or other wireless communication device. In one exemplary embodiment, the transceiver circuit 24 comprises a Global System of Mobile Communications (GSM) transceiver configured to implement the General Packet Radio Service (GPRS). The control circuit 26 controls the operation of the location tracking device as hereinafter described. The location circuit 22, communication circuit 24, and control circuit 26 may be implemented by one or more microprocessors, microcontrollers, hardware, firmware, or a combination therefor.

The location tacking device 20 may be programmed to periodically determine its location and store the location in memory. At a predetermined reporting interval, which may be configure by a user, the location tracking device establishes a connection with the location server 40 and uploads the location records to the location server 40. The location tracking device 20 may also be programmed to send its current location responsive to a predetermined event. For example, the location tracking device 20 may send its current position when an emergency button on the device is pressed by the child. The location server 40 may also send a request via Short Message Service (SMS) to the location tracking device 20 to report its location.

In some embodiments, the location tracking device 20 may be configured for voice communications between the location tracking device 20 and other devices. Such voice communications may be limited to a few authorized numbers. For example, the location tracking device 20 may store a few numbers that allow the child to initiate a call to a parent, relative, or an emergency service (e.g., 911, police, fire).

The location tracking device 20 may be incorporated into an article that is worn or carried by the child. In one exemplary embodiment, the location tracking device includes a wristband that is worn on the child's arm. The location tracking device 20 may serve as a watch and provide the date and time to the child. In other embodiments, the location tracking device 20 may take the form of a pendant that hangs on a chain that is worn around the child's neck. The location tracking device 20 could also be incorporated into an article of clothing, book bag, or backpack.

Figure 3:
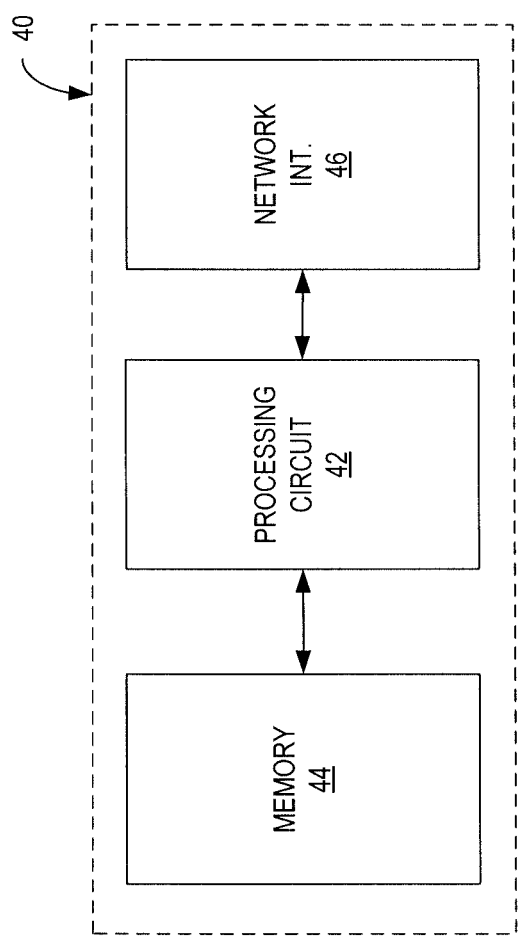
FIG. 3 illustrates the main functional components of a location server.

The location server 40 may comprise one or more computers configured and programmed to provide the location tracking services as herein described. The location server 40, shown in FIG. 3, comprises processing circuits 42 for executing applications to implement the location tracking services, memory 44 for storing the applications executed by the processing circuits 42 and data needed to provide the location tracking services, and a network interface 46 for connecting the location server 40 to the Internet. The processing circuits 42 may comprise one or more microprocessors, hardware, firmware, or a combination thereof. User data, configuration data, and location records may be stored in a relational database accessible via a database server.

In some embodiments, one or more predefined "safe zones" may be stored in the location server 40. A safe zone is may be defined by a center point and radius. The location server 40 may be programmed to detect when the boundary of the safe zone is crossed by a location tracking device 20.

Figure 4:
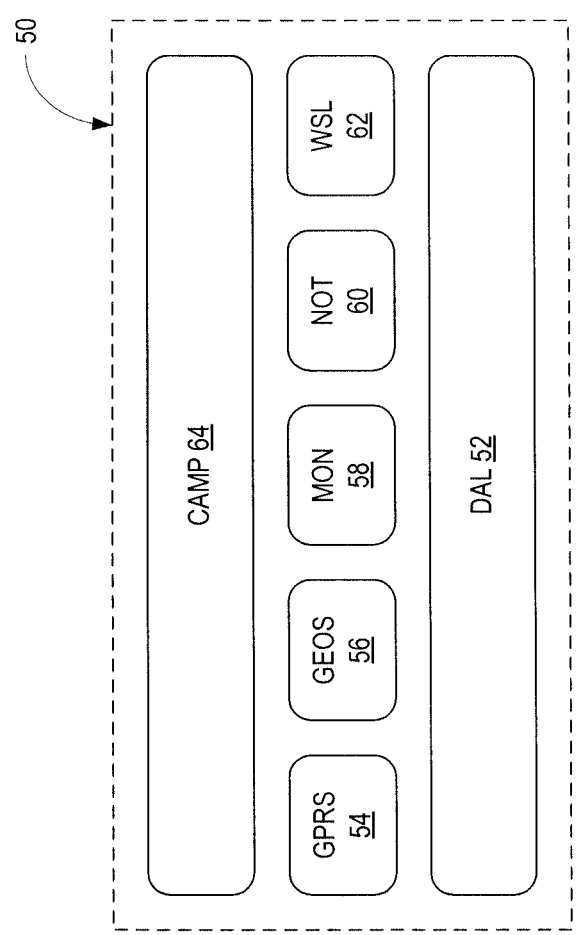
FIG. 4 illustrates a software architecture for a location server.

In one exemplary embodiment, the location server 40 runs on a Windows Server operating system. FIG. 4 shows the main components of a location tracking application 50 executed by the location server 40. The main components of the location tracking application 50 include a data access layer 52, GPRS service 54 (GPRS), an optional geolocation service 56 (GEOS), monitoring service 58 (MON), notification service 60 (NOT), web service layer (WSL) 62, and a configuration, administration, and monitoring portal (CAMP) 64.

The data access layer 52 comprises a data server application that uses one or more relational databases to store user and account information, location records, and configuration settings for location tracking devices 20. The data access layer 52 may also include a geolocation database used to provide geolocation servers as hereinafter described. In one exemplary embodiment, the data server application is based on the Microsoft Entity Framework (Version 4.3.1 or above) and uses a database server (e.g., Microsoft SQL Server 2008 database) for storing data. The database server application may be distributed across multiple database servers.

The GPRS service 54 manages communications between the location tracking devices 20 and location server 40 as will be hereinafter described in more detail. In one exemplary embodiment, the GPRS service 64 is a Windows service that accepts TCP/IP connection requests on predefined IP addresses and ports, and saves location information to the database servers. Location tracking devices 20 will use the GPRS network to connect to the GPRS service 54 and send location information. The communication protocol calls for communicating with the location tracking devices 20 are described in more detail below.

The geolocation service 56 provides a mechanism for estimating the location of a location tracking device 20 when GPS positioning is not available. The geolocation service 56 maintains a geolocation database that contains a list of access nodes in WiFI and cellular networks, and the locations of the access nodes. When GPS positioning is not available, the location tracking device 20 may report each access node that it detects from a given location and the received signal strength of the signals received from each access node. Based on the location data stored in the geolocation database and the signal strength measurements from the location tracking device 20, the geo-location service of the location server 40 estimates the location of the location tracking device 20.

The monitoring service 58 monitors the GPRS service 64 and database servers. If the monitoring service detects that the GPRS service 64 is not running, the monitoring service 58 will attempt to start it automatically. In case the GPRS service 64 is not started within a predetermined time, the monitoring service 58 will send an email notification to the administrator and log the event. The monitoring service 58 will also scan registered database servers at a periodic interval that may be configured by the administrator. Whenever the state of a database server has changed, the monitoring service 58 will issue a command to the GPS service 64 to refresh the servers. If any of the database servers is not functioning, the monitoring service 58 will send a notification to the administrator and log the event.

The monitoring service 58 may also monitor the activity of the location tracking devices 20. Device activity monitoring may be enabled separately for each location tracking device 20. If device activity monitoring is enabled, the monitoring service 58 will check the time of the last location report from the location tracking device 20. If the elapsed time since the last reported location exceeds reporting interval configured for the device, the monitoring service 58 will create a "void log" record in the database and set it as active until a new location report is received. The "void log" record will indicate that the location tracking device 20 has been either switched off or is not functioning properly.

The notification service 60 handles the scheduled delivery of various notifications related to device operation and user security. The notification service 60 includes three sub-components: a SMS dispatcher, an APN dispatcher, and an email dispatcher. The SMS dispatcher is responsible for delivering automated messages generated by various components of the location server. All messages sent by the SMS dispatcher are saved to the database. The APN dispatcher is used to deliver free notifications over Apple Push Notification Service. Such notifications are saved to the database for a limited time and may be removed at scheduled intervals. The email dispatcher delivers emails with token URLS to users. Token URLS are used as an enhancement of user account security. The token URLS include an email verification token, password recovery token, and password restore token. The email verification token is sent during user registration and is used for validating email addresses provided by a user. The password recovery token is sent to a user that has lost or reset a password. The password restore token is used to restore a password if the account password was changed without authorization. The token URLS are used only once, after which they are marked as unusable.

The web service layer (WSL) 62 exposes data stored by the location server 40 to a web portal and smartphone applications to enable communication between the location server 40 and monitoring devices 70. The WSL 62 comprises an end-point to which the web portal and smartphone applications connect. The web portal and smartphone application enable user account management, device management, safe zone management and other functions.

The configuration, administration, and monitoring portal (CAMP) 64 provides a high level, graphical user interface to allow authorized personnel to administer the system, configure location tracking devices, and manage user accounts. The CAMP module 64 communicates directly with the data access layer 52 to perform the administration functions.

A defined set of protocols is used for communication between the GPRS service 44 and the location tracking devices 20. In one exemplary embodiment, the communication protocols include a device authentication protocol (DAP), location update protocol (LUP), settings synchronization protocol (SSP), and security initialization protocol (SIP).

Figure 5:
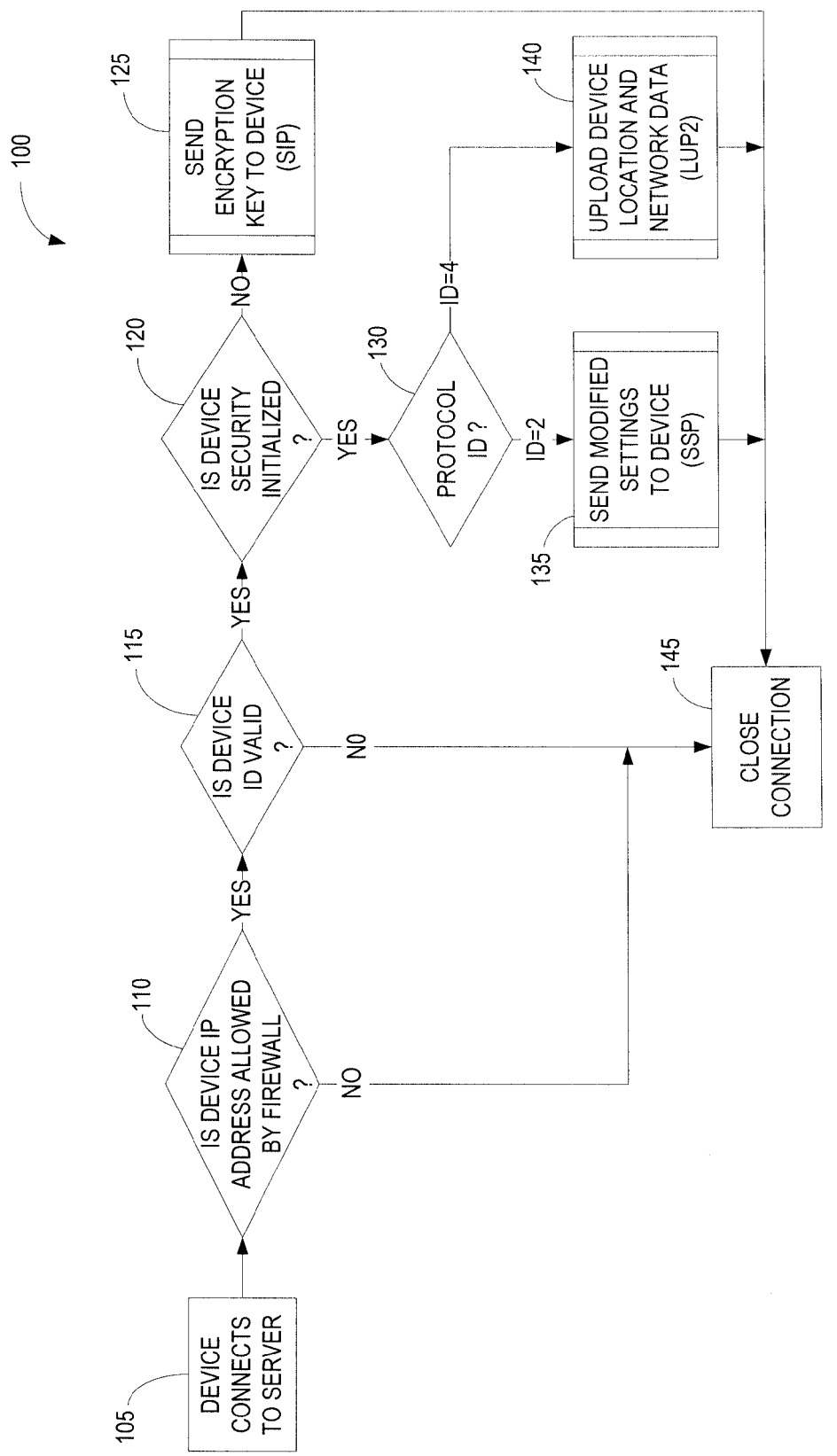
FIG. 5 illustrates a communication protocol for communication between a location server and a location tracking device.

FIG. 5 provides an overview of the communication procedure 100 for communication between a location tracking device 20 and location server 40. The procedure 100 begins when the location tracking device 20 connects to the location server 40 (block 105). The location server 40 maintains a firewall that permits TCP/IP connections only from specified IP addresses. When a TCP/IP connection is established with the location tracking device 20, the location server 40 checks whether the IP address of the connecting device is an authorized IP address (block 110). If not, the location server 40 terminates the session and closes the connection with the location tracking device 20 (block 145). The location server 40 may maintain a list of allowed IP addresses and list of blocked IP addresses. The connection is allowed if the IP address of the location tracking device 20 is found on the allowed list and not found on the blocked list.

If the connection is allowed, the location server 40 performs the DAP to authenticate the location tracking device 20 (block 115). If the location tracking device 20 is successfully authenticated, the session continues. If the location tracking device 20 is not successfully authenticated, the location server 40 terminates the session and closes the connection with the location tracking device 20 (block 145).

After the location tracking device is authenticated, the location server 40 checks whether device security has been initialized (block 120). If device security is not initialized, the location server initiates the SIP by sending an acknowledgement message (AM) containing a predetermined acknowledgment code (ACK Code) to the location tracking device 20 (block 125). The purpose of SIP is to provide the location tracking device 20 with an encryption key for use in encrypting messages sent to the location server 40. After completion of the SIP, the session ends and the connection is closed (block 145).

If device security is initialized, the location server 40 determines the protocol requested by the location tracking device 20 (block 130). In one exemplary embodiment, the location tracking device 20 may request to perform the LUP to upload location records or the SSP to update its device settings. The location server 40 initiates the requested protocol by sending an acknowledgement message (AM) containing a predetermined ACK Code to the location tracking device 20. If the SSP was requested, the SSP is performed (block 135) and the connection is then closed (block 145). If the LUP was requested, the LUP is performed (block 140) and the connection is then closed (block 145).

In some embodiments, the location server 40 may check whether the configuration settings for the location tracking device 20 have been modified since the location tracking device 20 was last updated. The configuration settings do not need to be checked if the location tracking device 20 has requested the SSP, as all settings will be checked during the SSP. However, if the location tracking device 20 has requested the LUP, some of the configuration settings may have changed but not yet been updated to the location tracking device 20. In this case, if it is determined that some device settings have been modified since the last update of the configuration settings, the location server 40 may request that the location tracking device 20 reconnect and request the SSP as soon as the LUP is completed.

The SIP, SSP, and LUP are initiated after device authentication by sending an Acknowledgement message from the location server to the location tracking device 20 with a predetermined Ack Code. The structure of the AM is shown in Table 1.

TABLE 1

Structure of Acknowledgment Message

| Acknowledgment Message |
|---|
| Ack Code |
| 1 byte |

To initiate the SIP, the location server sends an Acknowledgement message with the Ack Code 0x70 to the location tracking device 20. To initiate the SSP, the location server sends an Acknowledgement message with the Ack Code 0x64 to the location tracking device 20. To initiate the SSP, the location server sends an Acknowledgement message with the Ack Code 0x64 or 0x72 to the location tracking device 20. ACK Code 0x72 informs the location tracking device 20 that it should reconnect and request the SSP as soon as the LUP is completed.

All messages transmitted between location tracking devices and the GPRS service are encoded to bytes and sent as a byte stream. Messages transmitted during the SSP or LUP are additionally secured by encryption. Encryption is based on a random key that is generated by the location server 40 and provided to the location tracking device 20 during the SIP.

FIG. 6 illustrates the encryption and decryption process. The encryption engine performs an exclusive (XOR) operation using the message bytes and key bytes as operands to generate the encrypted message. The encrypted message may then be decrypted by the same process using the encrypted message bytes and key bytes as operands. In the event that the message exceeds the length of the encryption key, the key bytes can be repeated and added to the end of the encryption key to create a key of any desired length. In the event that the message is shorter than the encryption key, the encryption key can be truncated so that it will have the same number of bytes as the message. In order for encryption to be used, the location tracking device 20 has to complete the security initialization process.

Figure 7:
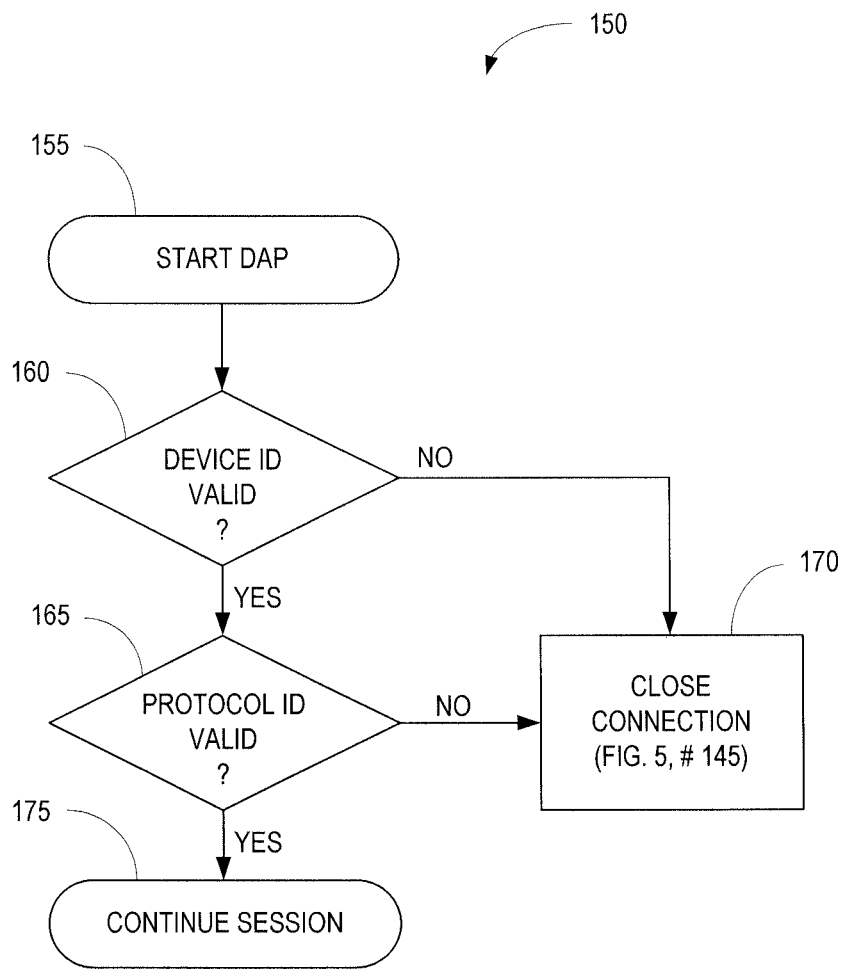
FIG. 7 illustrates a device authentication procedure for authenticating a location tracking device.

FIG. 7 illustrates an exemplary procedure 150 implementing the device authentication protocol (DAP) in one exemplary embodiment. When a TCP connection is established, the location tracking device 20 sends a Connect message to the location server 40 (block 155). The Connect message contains a unique device identifier (e.g., IMSI) and a protocol identifier that identifies the communication protocol that the location tracking device 20 wants to perform. The structure of the connect message is shown in Table 2.

TABLE 2

Structure of Connect Message
Connect Message

| Protocol ID | Device ID |
|---|---|
| 1 byte | 1 byte |

In one exemplary embodiment, the location tracking device 20 may initiate the LUP or SSP.

After the Connect message is received, the location server 40 verifies that the location tracking device 20 is registered by checking the device ID (block 160) and that a valid protocol is requested (block 165). If the device identifier is not registered, or if an invalid protocol identifier is provided, the location server 40 terminates the session and closes the connection (block 170). If both are valid, the session continues (block 175).

Figure 8:
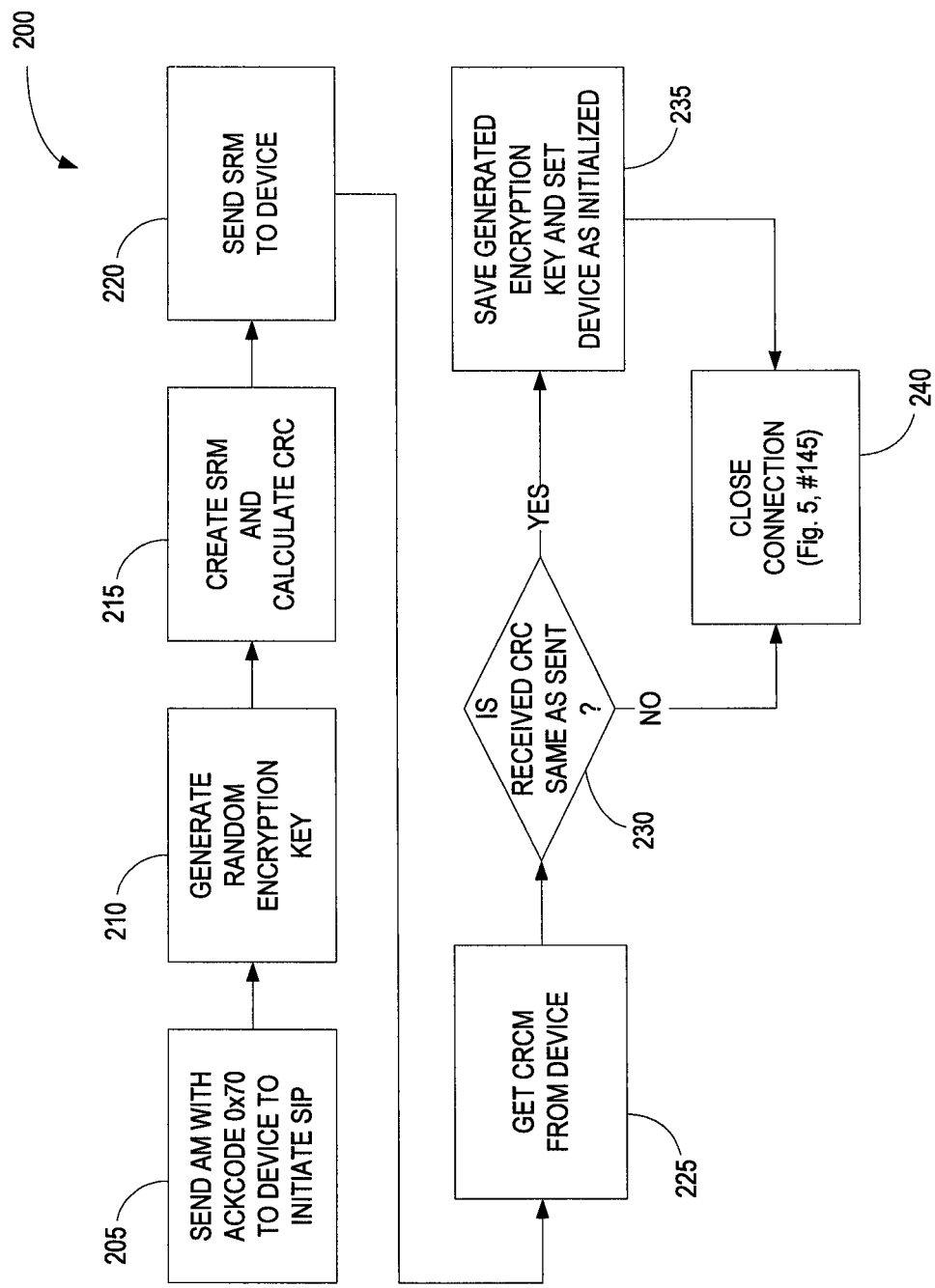
FIG. 8 illustrates a security initialization procedure for initializing a location tracking device with an encryption key.

FIG. 8 illustrates an exemplary procedure 200 implementing the Security Initialization Protocol (SIP) 200 in one embodiment. In order for message encryption to be used, device security must be initialized by receiving a shared encryption key from the location server 40. If the location tracking device 20 does not have a shared encryption key, the location server 40 may initiate the SIP after successful device authentication by sending an acknowledgement message (AM) with the acknowledgement code 0x70 (72 hexadecimal or 112 decimal) to the location tracking device (block 205).

The location server 40 then generates a random encryption key (block 210) and creates a settings record message (SRM) that includes the random encryption key along with a predetermined setting ID (e.g., 010) to indicate that the SRM contains an encryption key (block 215). The structure of the AM is shown in Table 3.

TABLE 3

Structure of Settings Record Message
Settings Record Message

| Setting ID | Setting Value | CRC32 |
|---|---|---|
| 2 bytes | 50 bytes | 4 bytes |

A cyclic redundancy check (CRC) is computed and appended to the SRM. The SRM with the appended CRC is then transmitted to the location tracking device 20 (block 220). The location tracking device 20 uses the CRC code to detect errors that may have occurred during transmission. If the SRM is received without error, the location tracking device 20 generates and sends a CRC message (CRCM), which contains the CRC code computed by the location tracking device during the error detection process (block 225). The structure of the CRCM is shown in Table 4.

TABLE 4

Structure of CRCM

CRC Message
CRC32
4 byte

After receiving the CRCM, the CRC code is extracted and compared to the CRC code transmitted with the SRM (block 230). If the received CRC code does not match the transmitted CRC code, the session is terminated and connection is closed (block 240). If the received CRC code matches the transmitted CRC code, the encryption key is saved with the configuration settings for the location tracking device 20 and the initialization setting is set to true (block 235). The connection is then closed (block 240).

Figure 9:
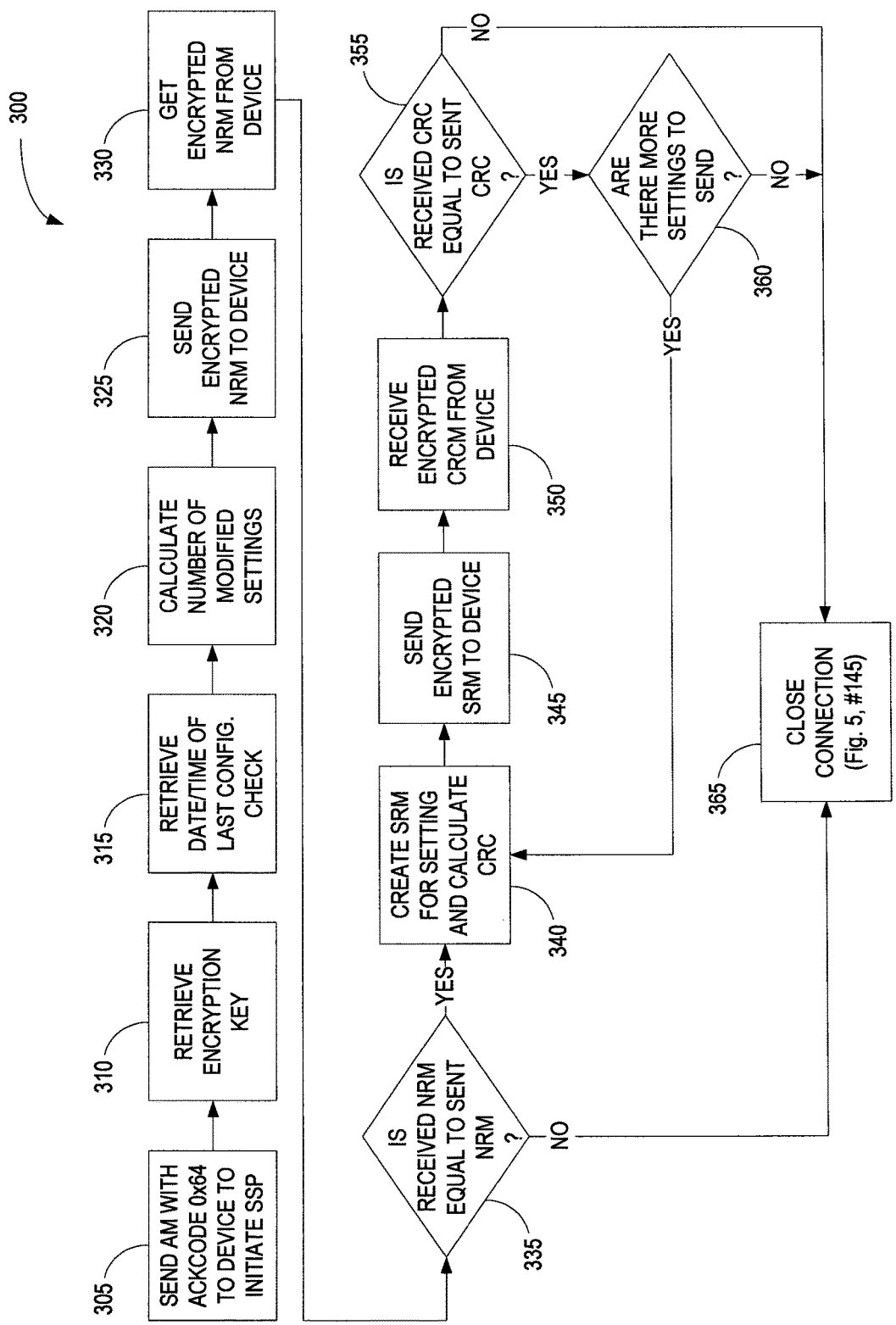
FIG. 9 illustrates a settings synchronization procedure for updating the settings in a location tracking device.

FIG. 9 illustrates an exemplary procedure 300 implementing the SSP according to an exemplary embodiment. The location tracking device 20 will connect to the location server 40 on a regular basis to check if there are any changes to the configuration settings that need to be updated. This check may be done periodically based on a device configuration setting. In some embodiments, the location server 40 may initiate synchronization when the location tracking device 20 connects to perform a location update if the location server 40 determines that any configuration settings have been modified since the last update of the location tracking device 20.

Each setting for the location tracking device 20 is identified by a unique setting identifier. The setting identifier values are stored as 16 bit (2 byte) integers in the range of 1-999. Setting values are always stored as arrays of 50 bytes, padded with 0 ASCII value bytes to the right. Table 5 below shows settings that may be implemented in an exemplary location tracking device 20.

TABLE 5

Available device settings

| ID | Name | Description | Access |
|---|---|---|---|
| 0000 | Device ID | Unique ID set in manufacturing | Administrator |
| 0001 | Hardware version | Value set in manufacturing | Read only |
| 0002 | Software version | Value saved in software | Read only |
| 0003 | GSM Number | GSM number of device | Read only |
| 0004 | Password | Password to protect configuration | Full |
| 0005 | Is GSM Pin requested | Value taken from SIM card | Administrator |
| 0006 | GSM Pin | SIM card pin number | Administrator |
| 0007 | Server IP | IP address of server | Administrator |
| 0008 | Server Port | TCP/IP port on server | Administrator |
| 0009 | Serve phone | Phone number on server | Administrator |
| 0010 | Encryption key | Security key for message encryption | Administrator |
| 0011 | Time format | 12 or 24 hour time format | Full |
| 1001 | Owner name | Owner details | Full |
| 1002 | Owner city | Owner details | Full |
| 1003 | Owner country | Owner details | Full |
| 1004 | Owner e-mail | Owner details | Full |
| 1005 | Owner GSM | Owner details | Full |

TABLE 5-continued

Available device settings

| ID | Name | Description | Access |
|---|---|---|---|
| 1006 | Holder name | Name of person carrying device | Full |
| 2001 | Phone 1 | Authorized phone number | Full |
| 2002 | Phone 2 | Authorized phone number | Full |
| 2003 | Phone 3 | Authorized phone number | Full |
| 2004 | Phone 4 | Authorized phone number | Full |
| 2005 | Phone 5 | Authorized phone number | Full |
| 2006 | VoIP central phone number | VoIP central phone number for emergency mode dialing | Full |
| 2007 | Phone Name 1 | Authorized phone name | Full |
| 2008 | Phone Name 2 | Authorized phone name | Full |
| 2009 | Phone Name 3 | Authorized phone name | Full |
| 2010 | Phone Name 4 | Authorized phone name | Full |
| 2011 | Phone Name 5 | Authorized phone name | Full |
| 3001 | Geo fence 1 name | Name of geo-fence zone | Full |
| 3002 | Geo fence 1 latitude | Centre of geo fence circle | Full |
| 3003 | Geo fence 1 longitude | Centre of geo fence circle | Full |
| 3004 | Geo fence 1 radius | Size of geo fence circle | Full |
| 3005 | Geo fence 1 report | Report on entry-regular: 0 exit-regular: 1 both-regular: 2 entry-emergency: 3 exist-emergency: 4 both-emergency: 5 | Full |
| 3006 | Geo fence 1 status | on: 1 off: 0 | Full |
| 3007 | Geo fence 2 name | Name of geo-fence zone | Full |
| 3008 | Geo fence 2 latitude | Centre of geo fence circle | Full |
| 3009 | Geo fence 2 longitude | Centre of geo fence circle | Full |
| 3010 | Geo fence 2 radius | Size of geo fence circle | Full |
| 3011 | Geo fence 2 report | Report on entry-regular: 0 exit-regular: 1 both-regular: 2 entry-emergency: 3 exist-emergency: 4 both-emergency: 5 | Full |
| 3012 | Geo fence 1 status | on: 1 off: 0 | Full |
| 3013 | Geo fence 3 name | Name of geo-fence zone | Full |
| 3014 | Geo fence 3 latitude | Centre of geo fence circle | Full |
| 3015 | Geo fence 3 longitude | Centre of geo fence circle | Full |
| 3016 | Geo fence 3 radius | Size of geo fence circle | Full |
| 3017 | Geo fence 3 report | Report on entry-regular: 0 exit-regular: 1 both-regular: 2 entry-emergency: 3 exist-emergency: 4 both-emergency: 5 | Full |
| 3018 | Geo fence 1 status | on: 1 off: 0 | Full |
| 3019 | Geo fence 4 name | Name of geo-fence zone | Full |
| 3020 | Geo fence 4 latitude | Centre of geo fence circle | Full |
| 3021 | Geo fence 4 longitude | Centre of geo fence circle | Full |
| 3022 | Geo fence 4 radius | Size of geo fence circle | Full |
| 3023 | Geo fence 4 report | Report on entry-regular: 0 exit-regular: 1 both-regular: 2 entry-emergency: 3 exist-emergency: 4 both-emergency: 5 | Full |
| 3024 | Geo fence 1 status | on: 1 off: 0 | Full |
| 3025 | Geo fence 5 name | Name of geo-fence zone | Full |
| 3026 | Geo fence 5 latitude | Centre of geo fence circle | Full |
| 3027 | Geo fence 5 longitude | Centre of geo fence circle | Full |

TABLE 5-continued

Available device settings

| ID | Name | Description | Access |
|---|---|---|---|
| 3028 | Geo fence 5 radius | Size of geo fence circle | Full |
| 3029 | Geo fence 5 report | Report on entry-regular: 0 exit-regular: 1 both-regular: 2 entry-emergency: 3 exist-emergency: 4 both-emergency: 5 | Full |
| 3030 | Geo fence 1 status | on: 1 off: 0 | Full |
| 4001 | Acquisition interval | Time in seconds between two GPS location acquisitions when device is not in motion | Full |
| 4002 | Acquisition distance | Distance in meters between two GPS location acquisitions | Full |
| 4003 | Data send interval | Time in seconds between two attempts to send data to server | Full |
| 4004 | Max number of saved records | Number of records saved that will start data sending regardless of setting for interval | Full |
| 4005 | Operation start time | Device operation interval start time | Full |
| 4006 | Operation end time | Device operation interval end time | Full |
| 4007 | Speaker volume | Volume of device speaker | Full |
| 5001 | Baby Call Threshold | Integer value of decibels | Full |
| 5002 | Baby Call enabled | on: 1 off: 0 | Full |
| 8001 | Last software check | Date and time when device software is verified for upgrade. Device will check for software upgrade once every day and update this setting. | Read only |
| 8002 | Last configuration check | Date and time when device configuration is verified on server | Read only |
| 9001 | Allowed GSM network for roaming | GSM network code. If device is in this network data sending will be enabled, otherwise sending is disabled and data is recorded in memory | Full |
| ... | Allowed GSM network for roaming | | |
| 9010 | Allowed GSM network for roaming | GSM network code. If device is in this network data sending will be enabled, otherwise sending is disabled and data is recorded in memory | Full |

The SSP may be requested by the location tracking device 20 during device authentication by specifying the protocol ID value of 2 in the Connect message. Upon successful DAP completion, the location tracking device 20 will receive an Acknowledgement message with an ACK code 0x64 (64 hexadecimal, 100 decimal), which indicates to the location tracking device 20 that the SSP is about to start (block 305). Alternatively, the SSP can be initiated by the location server 40 by transmitting an Acknowledgement message with the ACK code 0x72 if the Location Update Protocol was requested. In this case, after the LUP is completed, the location tracking device 20 will immediately attempt to reconnect and request SSP.

Once the SSP is started, the location server 40 retrieves the encryption key (Table 5, setting 0010) and timestamp for the last configuration check (Table 5, setting 8002) from the database server (blocks 310, 315). Each setting includes a timestamp indicating when the setting was last updated. Based on the configuration check timestamp, the location server 40 determines the number of settings that have been modified since the last time that the configuration settings were verified (block 320). The location server 40 sends a number of records message (NRM) to the location tracking device indicating the number of settings to be modified (block 325). The structure of the NRM is shown in Table 6.

TABLE 6

Structure of NRM

Number of Records Message
Ack Code
1 byte

Upon receipt of the NRM, the location tracking device 20 sends a reply NRM message back to the location server 40 to acknowledge the receipt of the NRM from the location server 40 (block 330). The structure of the replay NRM is the same as the NRM. The location server 40 compares the received NRM with the transmitted NRM (block 335). If the received NRM is equal to the transmitted NRM, the location server 40 begins transmitting the settings to the location tracking device 20 (blocks 340-360). If the received NRM does not equal the transmitted NRM, the session is terminated and the connection is closed (block 365).

In one exemplary embodiment, the configuration settings are sent from the location server 40 to the location tracking device 20 one at a time. For each setting, the location server 40 creates a settings record message (SRM) and appends a CRC code to the SRM (block 340). The SRM with the appended CRC code is encrypted and sent to the location tracking device 20 (block 345). Each time an SRM is sent to the location tracking device 20, the location tracking device 20 sends a CRC message as shown in Table 4 to acknowledge receipt of the SRM message (block 350). The CRC message contains the CRC that was appended to the SRM message. The location server 40 compares the received CRC to the transmitted CRC (block 355). If the received CRC equals the transmitted CRC, the location server 40 checks whether there are additional settings to send (block 360). If so, the process repeats until the last setting is transmitted. If the received CRC does not equal the transmitted CRC, the Settings Synchronization Protocol is terminated and the connection is closed (block 365).

Figure 10:
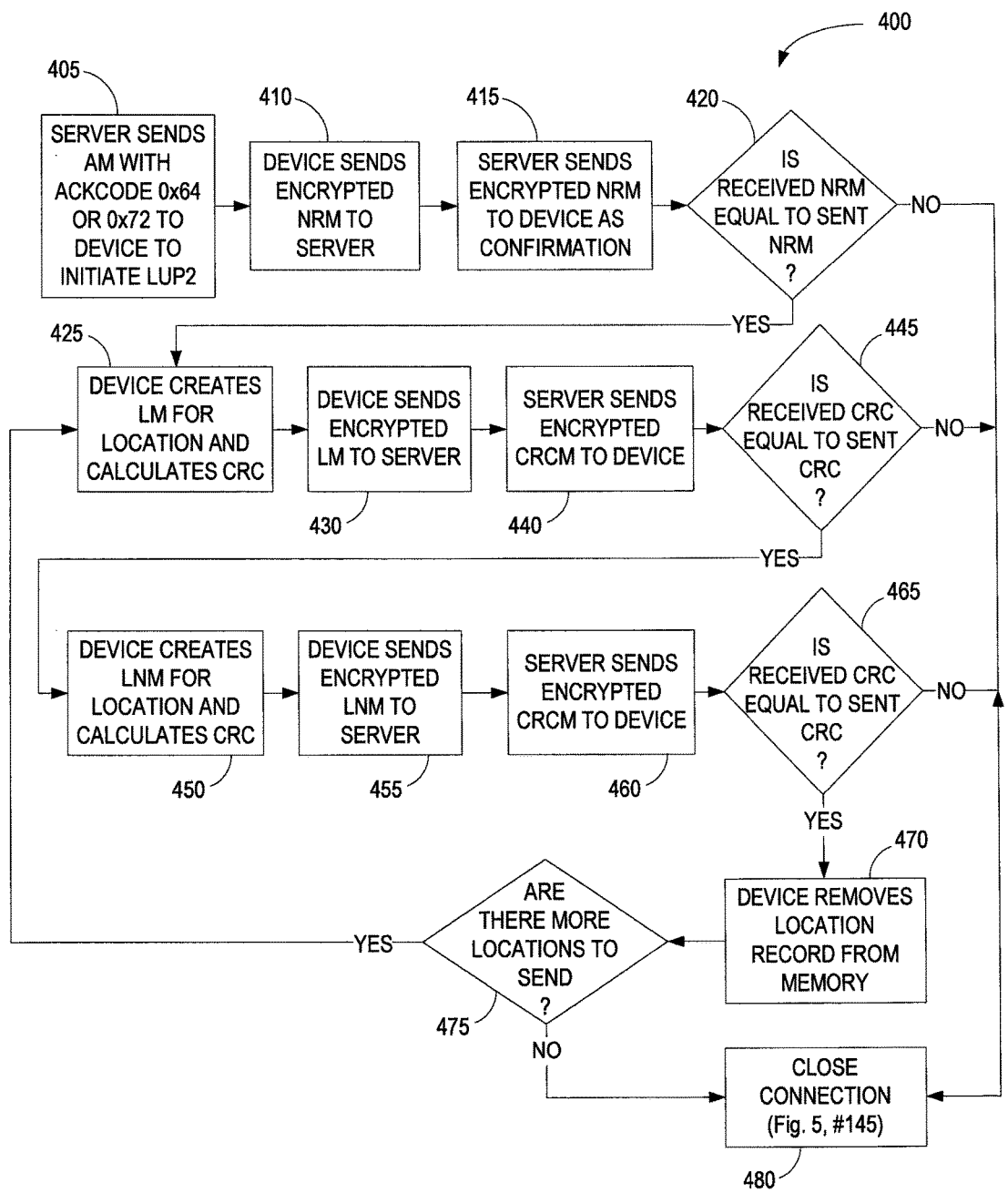
FIG. 10 illustrates a location update procedure or sending location information from a location tracking device to a location server.

FIG. 10 illustrates an exemplary procedure 400 implementing the Location Update Protocol (LUP) according to one embodiment. The LUP defines procedures for uploading location data and network data from the location tracking device 20 to the location server 40. The location tracking device 20 may periodically determine its location and store that location in memory. The location tracking device 20 may also periodically scan for neighboring access nodes, such as cell towers and WiFi access points. Identifying information concerning the nearby access nodes may be associated with the location stored in memory and transmitted to the location server 40 during the location update procedure. The location server 40 may use the "sightings" of network nodes to build a geolocation database. As used herein, the term "sighting" refers to the detection of an access node by a location tracking device.

The LUP may be requested by the location tracking device 20 by specifying the protocol ID value of 4 in the Connect message. The LUP is initiated by the location server 40 after device authentication is completed by sending an Acknowledgement message with ACK code 0X64 or 0X 72 to the location tracking device 20 (block 405). Once the LUP is initiated, the location tracking device 20 determines the number of location records that are stored and sends an encrypted NRM as shown in Table 6 to the location server 40 (block 410). The NRM indicates to the location server 40 the number of location records that will be transmitted. In some embodiments, the number of location records that can be sent in a single session may be limited to a pre-determined maximum value (e.g., 200 location records). If the location tracking device 20 has more than 200 location records, multiple sessions may need to be established to send all of the location records.

Upon receipt of the NRM from the location tracking device 20, the location server 40 sends a reply NRM to the location tracking device 20 to confirm receipt of the NRM from the location tracking device 20 (block 415). The location tracking device 20 compares the reply NRM to the transmitted NRM (block 420). If the reply NRM is equal to the transmitted NRM, the location tracking device sends the location records and associated network data to the location server (blocks 425-475). Otherwise, the procedure ends and the connection is closed (block 480).

In one exemplary embodiment, the location records are transmitted sequentially one at a time. The location tracking device 20 creates a location message (LM) for each location record and appends a calculated CRC code (block 425). The structure of the LM is shown in Table 7.

TABLE 7

Structure of Location Message

| Field | Size (bytes) |
|---|---|
| Time Stamp | 8 |
| Inputs | 1 |
| Battery Level | 1 |
| Emergency Mode | 1 |
| Reason | 1 |
| Latitude | 4 |
| Longitude | 4 |
| Altitude | 2 |
| Angle | 2 |
| Satellites | 1 |
| Speed | 2 |
| Valid GPS fix | 1 |
| No. of WiFi Scans (A) | 1 |
| No. of Cell Scans (B) | 1 |
| CRC32 | 4 |

As shown in Table 7, the location message may include status information as well as location information. The location tracking device 20 then encrypts the location message with the appended CRC and transmits it to the location server 40 (block 430). If the location message is received by the location server 40, it sends a CRC message back to the location tracking device 20 to acknowledge receipt of the location message (block 440). The CRC message includes the CRC that was appended to the location message. The location tracking device 20 compares the CRC in the CRC message with the CRC transmitted with the location message (block 445). If the CRC codes are the same, the process continues. Otherwise, the location update procedure ends and the connection is closed (block 480).

After sending the location message, the location tracking device 20 sends any network data associated with that location to the location server 40 (blocks 450-465). The location tracking device 20 creates a location network message (LNM) containing the network data and appends a CRC to the LNM (block 450). Each location message indicates the number of WiFi access points and number of cell towers sighted from that location. The structure of the location network message is shown in Table 8.

TABLE 8

Structure of Location Network Message

| Field | Size (bytes) |
|---|---|
| WiFi Data | Ax7 |
| Cell Data | Bx13 |
| CRC32 | 4 |

The values of A and B are given in the location message. The WiFi data contains 7 bytes for each access point. The WiFi data includes the MAC address of the access point (6 bytes) and the signal strength measurement. The Cell data contains 13 bytes for each cell. The Cell data includes the Mobile Country Code (MCC) (2 bytes), Mobile Network Code (MNC) (2 bytes), Location Area Code (LAC) (4 bytes), Cell ID (4 bytes, and signal strength measurement (1 byte).

The location tracking device 20 encrypts the location network message and sends it to the location server 40 (block 455). Upon receipt of the location network message from the location tracking device 20, the location server 40 sends a CRC message to the location tracking device 20 (block 460). The CRC message includes the CRC that was appended to the LNM. The location tracking device 20 compares the CRC in the CRC message with the CRC appended to the LNM (block 465). If the CRC codes are the same, the location tracking device 20 removes the location record and associated network data from memory (block 470) and checks whether it has more location records to send (block 475). This process repeats until all location records and associated network data have been transmitted. If the CRC contained in the CRC message does not match the CRC in the LNM, the location update procedure ends and the connection is closed (block 480).

In some embodiments of the invention, the location server 40 may provide geolocation services to estimate the location of location tracking devices 20 based on network data provided by the location tracking device 20. When a location tracking device 20 is unable to determine its position using GPS, it may send a list of neighboring access nodes (e.g. WiFi access points and cells) and corresponding signal strength measurements to the location server 40. The location server 40 may compute an estimated location for the location tracking device 20 from the network data. Techniques for determining the location of a location tracking device 20 from network data are described in U.S. Pat. Nos. 7,397,424 and 7,696,923, which are incorporated herein by reference in their entirety.

The geolocation service 56 provided by the location server 40 maintains a geo-location database. In one exemplary embodiment, the geolocation database includes a Network table that stores a list of access nodes along with the known or estimated locations of the access nodes. The locations of the access nodes may, in some instances, be provided by the network operators that control the access nodes. In other instances, the locations of the access nodes may be estimated from network data provided by a plurality of location tracking devices 20. Table 9 below shows the structure of the network table.

TABLE 9

Structure of Network Table
Network Table

| | |
|---|---|
| Node ID | Identifies access node (e.g. MAC address or MCC/MNC/LAC/Cell ID) |
| Longitude | Longitude of access node |
| Latitude | Latitude of access node |
| Sightings | Number of sightings |
| Radius | Radius of dispersion |

The geolocation database also includes a Sightings table that stores "sightings" of access nodes reported by the location tracking devices 20. In some embodiments, a sighting is reported to the location server 40 when the signal strength measurement meets a predetermined threshold. The sighting information is used to estimate the location of the access nodes if the location is not otherwise known. The structure of the Sightings table is shown in Table 10 below.

TABLE 10

Structure of Sightings Table
Sightings Table

| | |
|---|---|
| Device ID | Identifier of location tracking device (e.g. IMSI) |
| Node ID | Identifies access node (e.g. MAC address or cell ID) |
| Latitude | Latitude of location tracking device |
| Longitude | Longitude of location tracking device |

The geolocation service 56 communicates with the GPRS service 44. When network data is received during the LUP, the GPRS service 54 feeds the received network data to the geolocation service 56. The geolocation service 56 filters the received network data to determine whether it contains new information. New information is stored in the Sightings table.

Figure 11:
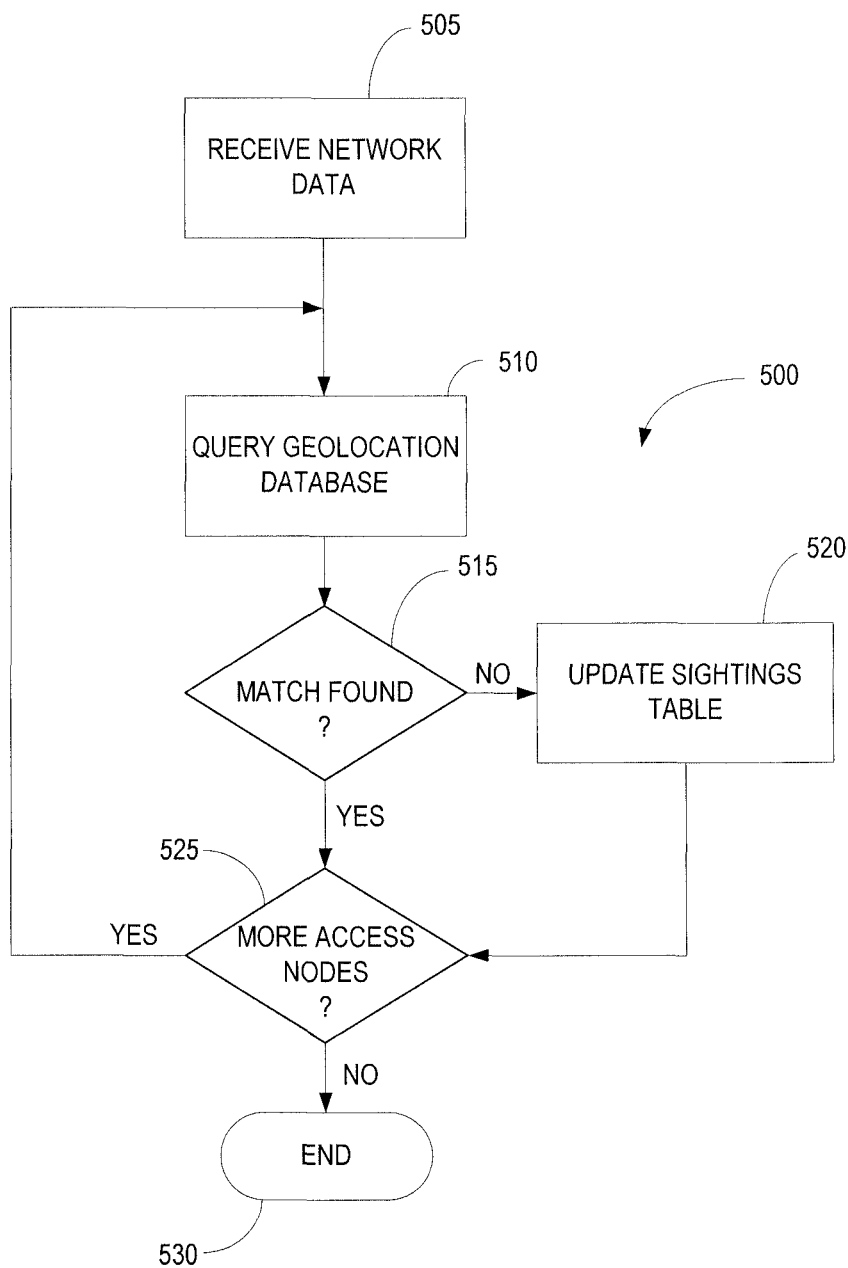
FIG. 11 illustrates a procedure for updating a geolocation database.

FIG. 11 illustrates an exemplary procedure 500 implemented by the location server 40 for updating the Sightings table in the geolocation database based on network data reported by location tracking devices 20. The network data may include access node identifier for one or more access nodes, location data (e.g. latitude and longitude) of the location tracking device 20 that made the sighting, and corresponding signal strength measurements. When network data is received from a location tracking device 20 (block 505), the location server 40 queries the geolocation database to determine whether a matching record is found (block 510). The query specifies the device identifier of the location tracking device 20 that made the sighting, the access node identifier, and coordinate data (e.g., latitude and longitude) of the location tracking device 20. The longitude and latitude may be trimmed to correspond to a geographic area of predetermined size. In one exemplary embodiment, the longitude and latitude are trimmed to four decimal places, which equates to a geographic cell of 8 m by 1 m. For a given geographic cell, the geolocation database stores one sighting for the location tracking device/access node pair. If a matching record is found in the geolocation database, the location server 40 checks whether there are more access nodes (block 525). If no matching record is found, a new record is created in the Sightings table (block 520). The procedure continues to until the last access node is reached and the process ends (block 530)

The information in the Sightings table is used to estimate the location of access nodes when the location is not otherwise available. The estimated locations of the access nodes are stored in the Network table. The geolocation service may periodically check for new entries in the Sightings table and, if any new entries are present, update the estimated location for one or more access nodes in the Network table. In one exemplary embodiment, the estimated location of an access node is computed according to:

$$lat = \frac{\sum_{i=1}^{N} lat_i}{N} \text{ and} \quad \text{Eq. (1)}$$

$$long = \frac{\sum_{i=1}^{N} long_i}{N} \quad \text{Eq. (2)}$$

where N is number of records in the Sightings table for the access node, lat is the latitude long is the longitude. The radius of dispersion is calculated as the distance of the furthest sighting to the estimated location of the access node.

In some embodiments, signal strength measurements may be taken into account in computing the estimated location of an access node. Signal strength measurements, in general, may range in value form −51 dB (best) to −113 dB (worst). The signal strength measurement is converted to a quality value according to the formula:

$$q = 10^{-\left(\frac{|S|}{10}\right)} \quad \text{Eq. (3)}$$

where S is the signal strength measurement in dB. The estimated location of an access node is then computed according to:

$$lat = \frac{\sum_{i=1}^{N} lat_i \cdot q_i}{\sum_{i=1}^{N} q_i} \text{ and} \quad \text{Eq. (4)}$$

$$long = \frac{\sum_{i=1}^{N} long_i \cdot q_i}{\sum_{i=1}^{N} q_i} \quad \text{Eq. (5)}$$

In this embodiment, the quality metric q biases the result toward the sightings that indicated the greatest signal strength.

Figure 12:
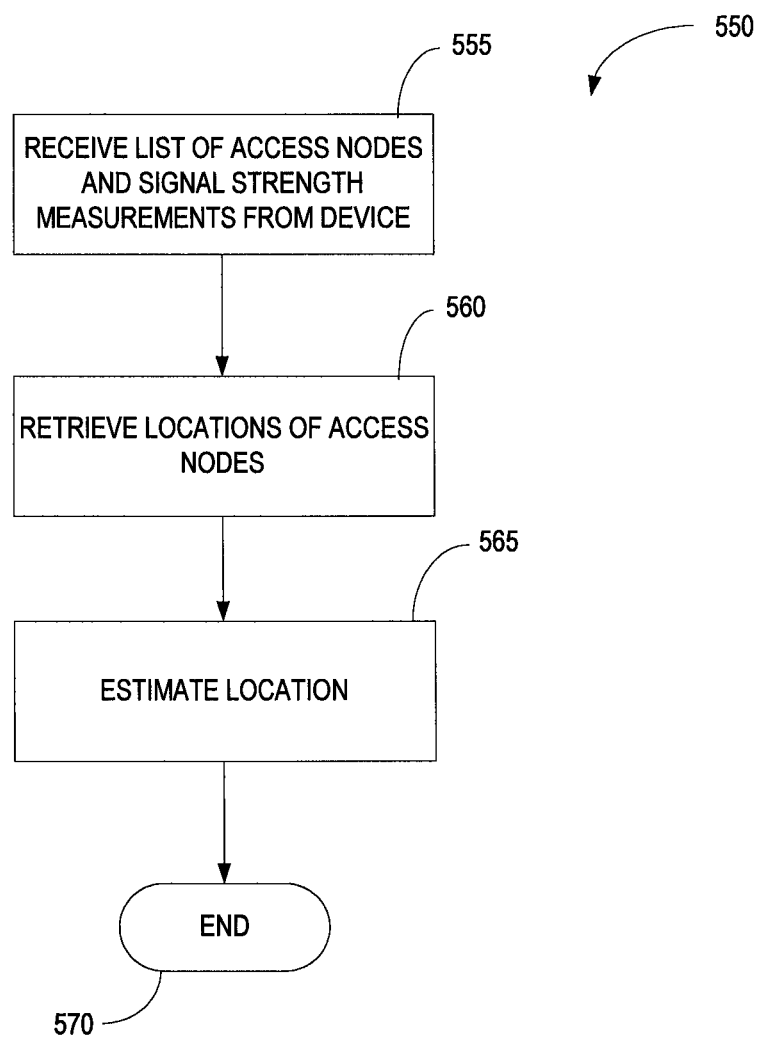
FIG. 12 illustrates a procedure for estimating the location of a location tracking device using a geolocation database.

The geolocation database may be used to estimate a location of a location tracking device 20 when GPS positioning is not available. FIG. 12 illustrates an exemplary procedure 550 for estimating the location of the location tacking device from network data. The location tracking device 20 sends network data to the location server 40. The network data includes access point identifiers and corresponding signal strength measurements for each access point sighted by the access node from its current location. The GPRS service 44 sends a request to the geolocation service 46 for the location of the location tracking device 20 (block 555). The request includes the list of access nodes and signal strength measurements provided by the location tracking device 20. The geolocation service 56 retrieves the locations of the access nodes from the geolocation database (block 560). Based on the location data retrieved from the geolocation database and the signal strength measurements from the location tracking device 20, the geolocation service 56 estimates the location of the location tracking device 20 (block 565) by triangulation or other known techniques. Various methods for estimating locations are described in U.S. Pat. Nos. 7,397,424 and 7,696,923 which are incorporated herein in their entirety by reference. The estimated location is then returned to the GPRS service 46 (block 570).

In some embodiments of the invention, the location server 40 may query a third party geolocation service to obtain an estimated location of the location tracking device 20. Available third party geo-location services include the Navizon geolocation service. Those skilled in the art will appreciate that the particular geo-location techniques and/or services are not a material aspect of the invention and that any available geo-location technique and/or service may be used for location estimation.

What is claimed is:

1. A location update method implemented by a location tracking device, said location update method comprising:
   determining a number of location records to be transmitted;
   sending a first number of records message to the location server indicating the number of location records to be transmitted from the location tracking device to the location server;
   receiving by the location tracking device a second number of records message from the location server; and
   sending the location records from the location tracking device to the location server if the first and second number of record messages are equal.

2. The method of claim 1 further comprising terminating the location update procedure and closing the connection with the location server if the first and second number of record messages are not equal.

3. The method of claim 1 wherein sending the location records from the location tracking device to the location server comprises:
   creating a location message for each location record to be transmitted, each said location message including a timestamp and location data indicating a location of the location tracking device at a time indicated by the timestamp;
   appending a check code to each location message; and
   sending each location message and appended check code to the location server;
   receiving, for each location message, a reply message from the location server, said reply message including a check code computed by the location server on the location message;
   verifying the received check code contained in each reply message; and
   if the received check code is valid, deleting the location record from memory.

4. The method of claim 3 further comprising terminating the location update procedure and closing the connection with the location server if the received check code for the location message is invalid.

5. The method of claim 3 further comprising encrypting each location message prior to sending the location message to the location tracking device.

6. The method of claim 1 further comprising sending to the location server, during said location update procedure, network data associated with one or more of the location records, wherein said network data identifies an access node and signal strength measurement for an access node.

* * * * *